United States Patent [19]

Peterson et al.

[11] Patent Number: 5,962,541
[45] Date of Patent: Oct. 5, 1999

[54] ISOCYANATE-TERMINATED PREPOLYMERS AND RIGID-FOAMS PRODUCED THEREFROM

[75] Inventors: Brian H. Peterson, Minneapolis, Minn.; Frank C. Rossitto, Pittsburgh; William J. Nicola, Jr., Burgettstown, both of Pa.; Clarence D. Blue, New Martinsville, W. Va.

[73] Assignee: Bayer Corporation, Pittsburgh, Pa.

[21] Appl. No.: 09/095,081

[22] Filed: Jun. 10, 1998

Related U.S. Application Data

[63] Continuation-in-part of application No. 08/961,403, Oct. 30, 1997, abandoned.
[51] Int. Cl.⁶ .................................................. C08G 18/10
[52] U.S. Cl. .......................... 521/131; 521/159; 156/77; 156/78; 156/79
[58] Field of Search .................................. 521/159, 131; 156/77, 78, 79

[56] References Cited

U.S. PATENT DOCUMENTS 4,791,148 12/1988 Riley et al. .............................. 521/159
5,362,764 11/1994 Londrigan et al. ..................... 521/112

Primary Examiner—Rachel Gorr
Attorney, Agent, or Firm—Joseph C. Gil; Lyndanne M. Whalen

[57] ABSTRACT

NCO-terminated prepolymers are made by reacting a polymeric diphenylmethane diisocyanate (PMDI) and a polyol having a functionality of from about 1.8 to about 4.0 and a molecular weight of from about 400 to about 2,000. The PMDI and polyol are reacted in amounts such that the equivalent ratio of isocyanate groups to hydroxyl groups is from about 15:1 to about 160:1. These prepolymers are useful in the production of polyurethane foams, particularly laminated foams.

6 Claims, No Drawings

ISOCYANATE-TERMINATED PREPOLYMERS AND RIGID-FOAMS PRODUCED THEREFROM

This application is a Continuation-In-Part of application Ser. No. 08/961,403 filed Oct. 30, 1997, now abandoned.

BACKGROUND OF THE INVENTION

The present invention relates to isocyanate-terminated ("NCO-terminated") prepolymers and to a process for producing foams from these prepolymers.

Laminated foams are known. It is also known to apply rigid foam-forming mixtures to surfaces and substrates to produce laminated foams and panels useful for construction and appliance applications. Suitable foam-forming mixtures are characterized by the ability to be applied evenly on a surface (i.e., good flowability) and uniform foaming. Desirable properties of foams which have been found to be particularly useful in lamination applications include firmness, good dimensional stability and good physical appearance.

Rigid laminated foams having good physical properties produced with less blowing agent is one of the goals of those seeking to develop and improve current foam lamination systems.

SUMMARY OF THE INVENTION

It is an object of the present invention to provide an NCO-terminated prepolymer which is particularly useful in the production of laminated foams.

It is also an object of the present invention to provide a foam lamination process in which the foam-forming mixture employed includes less blowing agent and NCO-terminated prepolymer than known systems but which produces foams having physical properties comparable to those currently being used to produce laminates.

These and other objects which will be apparent to those skilled in the art are accomplished by reacting a polymeric diphenylmethane diisocyanate (also known as "polyphenyl polymethylene polyisocyanate" and as "PMDI") having a viscosity at 25° C. of from about 100 to about 350 mPa·s with a polyol having a functionality of from about 1.8 to about 4.0 and a molecular weight of from about 400 to about 2,000 in amounts such that the equivalent ratio of isocyanate groups in the PMDI to the hydroxyl groups in the polyol is from about 15:1 to about 160:1. The resultant NCO-terminated prepolymer may then be combined with an isocyanate-reactive compound and a blowing agent to produce a foam-forming mixture which may then be used to produce a laminated foam. Hydrogenated chlorofluorocarbons ("HCFC's") are among the preferred blowing agents.

DETAILED DESCRIPTION OF THE PRESENT INVENTION

The present invention relates to NCO-terminated prepolymers and to a foam lamination process in which these NCO-terminated prepolymers are employed.

The NCO-terminated prepolymers of the present invention are produced by reacting a polymeric diphenylmethane diisocyanate preferably having an NCO content of from about 29 to about 33.5%, most preferably from about 31 to about 32.5% and a viscosity at 25° C. of from about 50 to about 1,000 mPa·s, preferably from about 100 to about 350 mPa·s, most preferably from about 150 to about 220 mPa·s with a polyol. The polymeric diphenylmethane diisocyanate employed in the practice of the present invention may include from about 38 to about 50% by weight (based on total weight of isocyanate) of monomeric diphenylmethane diisocyanate, preferably from about 42 to about 48% by weight. The remainder of the polymeric diphenylmethane diisocyanate is made up of the higher oligomers of diphenylmethane diisocyanate.

Any of the commercially available polymeric diphenylmethane diisocyanates satisfying these criteria may be used in the practice of the present invention. Examples of suitable polymeric diphenylmethane diisocyanates which are commercially available include those sold under the names Mondur MR and Mondur MR Light by Bayer Corporation, PAPI 27 and PAPI 37 by Dow Corporation, Rubinate M by ICI Chemical Corporation, and Lupranate M205 by BASF.

In the practice of the present invention, the polymeric diphenyl-methane diisocyanate is reacted with a polyol, preferably a polyester polyol or a polyol blend having a functionality of from about 1.8 to about 4, preferably from about 1.8 to about 2.4, most preferably from about 1.9 to about 2.2. This polyol will generally have a number average molecular weight (as determined by end group analysis) of from about 400 to about 2,000, preferably from about 400 to about 800, most preferably from about 450 to about 500. Particularly preferred polyols are polyether and polyester polyols, polyester polyol blends and combinations of these polyols.

Polyester polyols satisfying the requirements of the present invention include the reaction products of polyhydric alcohols (preferably dihydric alcohols to which trihydric alcohols may be added) with polybasic (preferably dibasic) carboxylic acids, the corresponding carboxylic acid anhydrides and polycarboxylic acid esters of lower alcohols or mixtures thereof. The polycarboxylic acids may be aliphatic, cycloaliphatic, aromatic and/or heterocyclic and they may be substituted, e.g., by halogen atoms, and/or unsaturated.

Examples of suitable polycarboxylic acids include: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate.

Suitable polyhydric alcohols include: ethylene glycol; 1,2- and 1,3-propylene glycol; 1,3- and 1,4-butylene glycol; 1,6-hexanediol; 1,8-octanediol; neopentyl glycol; cyclohexanedimethanol; (1,4-bis-(hydroxy-methyl)cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethylolpropane.

The polyesters may also contain a portion of carboxyl end groups. Polyesters of lactones, e.g., $\epsilon$-caprolactone or hydroxyl carboxylic acids such as $\omega$-hydroxycaproic acid, may also be used.

Polyester polyols which are formed from ethylene glycol and/or diethylene glycol and phthalic acid anhydride, dimethylterephthalate or phthalic acid are particularly preferred.

Any of the commercially available polyester polyols satisfying the above-specified functionality and molecular weight requirements given above may be used in the practice of the present invention. Polyester polyols and polyester polyol blends of the type disclosed in U.S. Pat. No. 4,644,027 in which a hydrophobic compound is incorporated into the polyester polyol are particularly useful. Specific examples of suitable commercially available polyester polyols include the polyester polyol blend Stepanpol 2502A (available from Stepan Chemical) and Res D 2029 (available from Hoechst Celanese).

Any of the commercially available polyether polyols satisfying the above-specified functionality and molecular weight requirements may be used in the practice of the present invention. Suitable polyether polyols are described below being suitable for the production of foams from the prepolymers of the present invention.

The prepolymers of the present invention are made by reacting the polymeric diphenylmethane diisocyanate with the polyester polyol in amounts such that the equivalent ratio of NCO groups in the polymeric diphenylmethane diisocyanate to hydroxyl groups in the polyester polyol is from about 15:1 to about 160:1, preferably from about 25:1 to about 39:1. This reaction is generally carried out at temperatures of from about 40 to about 80° C., preferably from about 50 to about 60° C. for periods of from about 10 to about 60 minutes, preferably from about 20 to about 40 minutes.

Mixtures of polyols may optionally be used as the polyhydroxyl material used to produce the prepolymers of the present invention.

The NCO-terminated prepolymers of the present invention are characterized by NCO contents of from about 33.0 to about 24.2%, preferably from about 28.2 to about 29.6%. These prepolymers have a viscosity which is greater than that of the polymeric diphenylmethane diisocyanate from which they were formed. More specifically, the viscosity at 25° C. of the prepolymers of the present invention will generally be in the range of from about 150 to about 20,000 mPa·s, preferably from about 500 to about 800 mPa·s.

The NCO-terminated prepolymers of the present invention may be used to produce polyurethane and/or polyisocyanurate foams. These prepolymers are generally the only isocyanate group containing material used to produce foams in accordance with the present invention. Other isocyanates may optionally be included in the foam-forming reaction mixture, but the use of such other optional isocyanates is not preferred.

The NCO-terminated prepolymers of the present invention may be reacted with any of the known isocyanate reactive materials having a functionality of from about 1 to about 8, preferably from about 1.8 to about 2.4 and a number average molecular weight (determined by end group analysis) of from about 60 to about 6,000, preferably from about 400 to about 600. Examples of suitable isocyanate-reactive materials include polyester polyols, polyether polyols, polycarbonates, polythioethers, amine terminated polyether polyols, polyester amides, polyacetals and polyacrylates.

Any of the known polyester polyols satisfying these functionality and molecular weight criteria may be used to produce foams in accordance with the present invention. Particularly suitable polyester polyols include those described above as being suitable for the production of the NCO-terminated prepolymer of the present invention.

Suitable polycarbonates containing hydroxyl groups include those obtained by reacting diols with phosgene, a diarlycarbonate (e.g., diphenyl carbonate) or cyclic carbonates (e.g., ethylene or propylene carbonate). Examples of suitable diols include: 1,3-propanediol; 1,4-butanediol; 1,6-hexanediol; diethylene glycol; triethylene glycol; and tetraethylene glycol. Polyester carbonates obtained by reacting polyesters or polylactones (such as those described above) with phosgene, diaryl carbonates or cyclic carbonates may also be used in the practice of the present invention.

Polyether polyols which are suitable for producing the foams of the present invention include those obtained in known manner by reacting one or more starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. Polyethers which do not contain more than about 10% by weight of ethylene oxide units are preferred. Polyethers obtained without the addition of ethylene oxide are most preferred. Suitable starting compounds containing reactive hydrogen atoms include polyhydric alcohols (described above as being suitable for preparing polyester polyols); water; methanol; ethanol; 1,2,6-hexane triol; 1,2,4-butane triol; trimethylol ethane; pentaerythritol; mannitol; sorbitol; methyl glycoside; sucrose; phenol; isononyl phenol; resorcinol; hydroquinone; and 1,1,1- or 1,1,2-tris-(hydroxyl phenyl)-ethane.

Polyethers modified by vinyl polymers are also suitable for producing foams in accordance with the process of the present invention. Such modified polyethers may be obtained, for example, by polymerizing styrene and acrylonitrile in the presence of a polyether (U.S. Pat. Nos. 3,383,351; 3,304,273; 3,523,095; 3,110,695 and German Patent No. 1,152,536).

The polythioethers useful in the production of the laminated foam products in accordance with the process of the present invention include the condensation products obtained from thiodiglycol on its own and/or with other glycols, dicarboxylic acids, formaldehyde, aminocarboxylic acids or amino alcohols. These condensation products may be polythio-mixed ethers, polythioether esters or polythioether ester amides, depending on the co-components.

Amine-terminated polyether useful in preparing the foam laminates of the present invention may be prepared by reacting a primary amine with a polyether containing terminal leaving groups such as halides, or mesylates as disclosed in U.S. Pat. Nos. 3,666,726, 3,691,112, 5,066,824 and 5,693,864.

Suitable polyacetals include those prepared from aldehydes (e.g., formaldehyde) and glycols such as diethylene glycol, triethylene glycol, ethoxylated 4,4'-dihydroxydiphenyldimethylmethane, and 1,6-hexanediol. Polyacetals prepared by the polymerization of cyclic acetals may also be used in the practice of the present invention.

Polyhydroxy polyester amides and polyamines useful in the production of the foams of the present invention include the predominantly linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxy-functional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate and 2-isocyanatoethyl methacrylate.

Other useful isocyanate-reactive materials include the polyhydric alcohols which have previously been described in the process for the preparation of the polyester polyols and polyether polyols. Dihydric alcohols are preferred. The weight ratio of the low molecular weight to the high molecular weight material containing two or more hydroxyl groups is generally from about 0.001 to about 2, preferably from about 0.01 to about 0.40.

In addition to the above-mentioned isocyanate-reactive compounds, monofunctional and even small amounts of trifunctional and higher functional compounds generally known in polyurethane chemistry may be used to produce the prepolymers of the present invention. For example, trimethylolpropane may be used in special cases in which slight branching is desired.

Any of the known blowing agents may be used to produce foams in accordance with the present invention. The HCFC and other non-CFC blowing agents which do not significantly contribute to ozone depletion are particularly preferred. Specific examples of suitable blowing agents include: 1,1-dichloro-1-fluoroethane (HCFC-141b), 1,1,1,3,3-pentafluoro-propane (HFC-245fa), n-pentane, cyclopentane, isopentane, 1-chloro-1,1-difluoromethane (HCFC R-22) and tetrafluoroethane (HFC-134). These blowing agents are generally used in an amount of from about 10 to about 40% by weight, based on total weight of the isocyanate-reactive component.

The NCO-terminated prepolymer plus any optional isocyanate group containing materials are reacted with the isocyanate reactive material(s) in an amount such that the equivalent ratio of all NCO groups present to all isocyanate-reactive groups present is from about 1.5:1 to about 3.5:1, preferably from about 2.0:1 to about 2.5:1. This foam forming-reaction generally begins at room temperature and exotherms at a temperature up to about 150° C.

Catalysts may be used to aid the reaction. Examples of catalysts useful for promoting urethane reactions include triethylene-diamine, potassium acetane, potassium octoate PMDETA, other tertiary amines, formic acid-blocked quaternary ammonium salts, triazines, etc.

The foams of the present invention may be produced by any of the known lamination methods. In such lamination processes, the foam-forming mixture is applied (e.g., by spraying) to a flat surface or substrate on which it is allowed to expand.

Substrates to which the foam-forming mixture of the present invention may be applied include any substrate to which the foam-forming mixture will adhere. Paper, aluminum panels, aluminum foil and fiberglass mat are particularly preferred substrates.

The foam-forming mixture is generally applied to the selected substrate in an amount such that a foam having the desired height will be formed. The foam-forming mixture may be applied to the substrate using any of the commercially available foam application and lamination equipment.

Having thus described our invention, the following Examples are given as being illustrative thereof. All parts and percentages given in these Examples are parts by weight and percentages by weight, unless otherwise indicated.

EXAMPLES

The materials used in the Examples were as follows:

POLYISOCYANATE A: A polymeric diphenylmethane diisocyanate having an NCO group content of 31.5% and a Brookfield viscosity at 25° C. of 200 mPa·s which is commercially available from Bayer Corporation under the designation Mondur MR.

POLYISOCYANATE B: A polymeric diphenylmethane diisocyanate having an NCO content of 30.6% and a Brookfield viscosity at 25° C. of 700 mPa·s which is commercially available from Bayer Corporation under the designation Mondur 489.

POLYISOCYANATE C: A polymeric diphenylmethane diisocyanate prepolymer having an NCO content of 28.9% and a Brookfield viscosity at 25° C. of 650 mPa·s which is commercially available from Bayer Corporation under the name Mondur E-577.

POLYISOCYANATE D: A polymeric diphenylmethane diisocyanate having an NCO content of 28.9% and a Brookfield viscosity at 25° C. of 650 mPa·s which is commercially available from Bayer Corporation under the name Mondur E-1451.

POLYOL A: An aromatic polyester polyol blend having an OH Number of 240 and a functionality of 2.0 which is commercially available from Stepan under the name Stepanpol PS-2502A.

POLYOL B: An aromatic polyester polyol having an OH Number of 245 and a functionality of 2.0 which is commercially available from Hoechst Celanese under the name Terate 2541.

B-84PI: A silicone surfactant which is commercially available from Goldschmidt.

CATALYST A: A 38% potassium acetate in glycol solution which is commercially available from Air Products under the name Polycat 46.

CATALYST B: A 70% by weight solution of potassium octoate in diethylene glycol which is commercially available from Air Products under the name Dabco K-15.

CATALYST C: A tertiary amine catalyst which is commercially available from Rhein Chemie Corporation under the name Desmorapid PV.

HCFC-141b: 1,1-dichloro-1-fluoroethane.

Example 1

95 grams of POLYISOCYANATE A were reacted with 5 grams of POLYOL A in a three-necked round bottom flask at a temperature of 60° C. for a period of 0.5 hrs. (NCO/OH equivalent ratio=30.7:1) The resultant prepolymer had an NCO content of 28.9% and a viscosity at 25° C. of 650 mPa·s.

Examples 2–5

Foams having the same calculated density and % HCFC-141b content were made by hand mixing the materials listed in Table 1 in the amounts indicated in Table 1 and then allowing the foam-forming mixture to expand in 1 gallon cardboard cups and in cardboard boxes measuring 12 inches by 12 inches by 3 inches. The properties of the resultant laminated foams are reported in Table 1.

TABLE 1

| EXAMPLE | 2 | 3* | 4* | 5 |
|---|---|---|---|---|
| POLYOL B (pbw) | 91 | 91 | 91 | 91 |
| B-84PI (pbw) | 2 | 2 | 2 | 2 |
| Water (pbw) | 0.5 | 0.5 | 0.5 | 0.5 |
| CATALYST A (pbw) | 0.9 | 0.9 | 0.9 | 0.9 |
| CATALYST B (pbw) | 3.6 | 3.6 | 3.6 | 3.6 |
| CATALYST C (pbw) | 0.3 | 0.3 | 0.3 | 0.3 |
| EXAMPLE 1 Prepolymer (pbw) | 190.9 | — | — | 190.9 |
| POLYISO-CYANATE B (pbw) | — | 176.8 | 176.8 | — |
| HCFC-141b (g/mol) | 30.9 | 29.2 | 29.2 | 30.9 |
| % HCFC-141b in system | 9.6 | 9.6 | 9.6 | 9.6 |
| NCO/OH | 2.73 | 2.73 | 2.73 | 2.73 |
| End Height [1] (cm) | 75.7 | 71.0 | 71.5 | 73.1 |
| Pressure [2] (hPa) | 381 | 406 | 411 | 376 |
| Cream Time (sec) | 11 | 11 | 12 | 11 |
| Gel Time (sec) | 19 | 19 | 20 | 20 |
| Tack Free Time (sec) | 29 | 27 | 30 | 30 |
| Free Rise Density (lb/ft$^3$) | 2.25 | 2.42 | 2.41 | 2.24 |
| Cream Time (sec) | 11 | 13 | 12 | 11 |
| Gel Time (sec) | 24 | 21 | 21 | 23 |

TABLE 1-continued

| EXAMPLE | 2 | 3* | 4* | 5 |
|---|---|---|---|---|
| Tack Free Time (sec) | 33 | 35 | 31 | 34 |
| Core Free Rise Density (lb/ft³) | 1.72 | 1.81 | 1.83 | 1.74 |
| Firmness³ (cm) - 5 min. | 0.250 | 0.350 | 0.300 | 0.300 |
| Firmness³ (cm) - 10 min. | 0.325 | 0.425 | 0.375 | 0.375 |
| Firmness³ (cm) - 15 min. | 0.375 | 0.450 | 0.400 | 0.425 |

*Comparative Example
[1] Determined by ASTM 2237
[2] Pressure generated during foaming as determined by ASTM 2237
[3] Determined in accordance with the method disclosed in Reichmann, et al., Proceedings of the SPI-31st Annual Technical/Marketing Conference, October 18–21, 1988, Philadelphia, PA, pp. 370

It can be seen from the above-described data that foams made with the prepolymer of the present invention produce foams having higher end height without generating as much pressure during foaming as the foams produced with a polymeric diphenylmethane diisocyanate. The data also demonstrates that foams made with the prepolymer of the present invention had lower densities and higher firmness than foams made with PMDI even though the relative amount of blowing agent was the same for each foam composition.

Examples 6–11

Foams were made by hand mixing the materials listed in Table 2 in the amounts indicated in Table 2 and then allowing the mixture to foam. The properties of the foams are reported in Table 2.

TABLE 2

| Example | 6 | 7* | 8* | 9* | 10* | 11 |
|---|---|---|---|---|---|---|
| POLYOL B (pbw) | 91.0 | 91.0 | 91.0 | 91.0 | 91.0 | 91.0 |
| B-84PI (pbw) | 2.0 | 2.0 | 2.0 | 2.0 | 2.0 | 2.0 |
| Water (pbw) | 0.5 | 0.5 | 0.5 | 0.5 | 0.5 | 0.5 |
| CAT. A (pbw) | 0.9 | 0.9 | 0.9 | 0.9 | 0.9 | 0.9 |
| CAT. B (pbw) | 3.6 | 3.6 | 3.6 | 3.6 | 3.6 | 3.6 |
| CAT. C (pbw) | 0.3 | 0.3 | 0.3 | 0.3 | 0.3 | 0.3 |
| Ex. 1 Prepolymer (pbw) | 190.9 | — | — | — | — | 190.9 |
| Polyisocyanate B (pbw) | — | 176.8 | 176.8 | 176.8 | 176.8 | — |
| HCFC-141b (g/mol) | 2.2 | 2.1 | 2.1 | 2.1 | 2.1 | 2.2 |
| % HCFC-141b | 9.2 | 9.6 | 9.6 | 9.6 | 9.6 | 9.2 |
| NCO/OH | 2.73 | 2.73 | 2.73 | 2.73 | 2.73 | 2.73 |
| End Height¹ (cm) | 71.3 | 68.5 | 68.7 | 69.2 | 69.2 | 71.6 |
| Pressure² (hPa) | 360 | 424 | 380 | 400 | 416 | 354 |
| Cream Time (sec) | 10 | 12 | 12 | 12 | 12 | 11 |
| Gel Time (sec) | 22 | 21 | 21 | 21 | 21 | 21 |
| Tack Free Time (sec) | 31 | 31 | 32 | 32 | 33 | 33 |
| Free Rise (lb/ft³) | 2.23 | 2.27 | 2.26 | 2.27 | 2.30 | 2.21 |
| Cream Time (sec) | 10 | 12 | 12 | 12 | 12 | 11 |
| Gel Time (sec) | 22 | 20 | 21 | 21 | 21 | 22 |
| Tack Free Time (sec) | 37 | 36 | 34 | 33 | 34 | 35 |
| Core Free Rise Density (lb/ft³) | 1.84 | 1.87 | 1.78 | 1.85 | 1.82 | 1.81 |

*Comparative Example
Footnotes have same meaning as in Table 1.

Examples 12–16

Foams were made by combining the materials listed in Table 3 in the amounts indicated in that Table and then applying the foam-forming mixture to double belt conveyor. The properties of the resultant foams are also reported in Table 3.

TABLE 3

| EX. | 12 | 13 | 14 | 15 | 16 |
|---|---|---|---|---|---|
| Polyol B (pbw) | 100.00 | 100.00 | 100.00 | 100.00 | 100.00 |
| B-84PI (pbw) | 2.20 | 2.0 | 2.0 | 2.20 | 2.20 |
| Water (pbw) | 0.55 | 0.5 | 0.5 | 0.55 | 0.55 |
| CAT. A (pbw) | 3.95 | 3.58 | 3.54 | 3.95 | 3.95 |
| CAT. B (pbw) | 0.935 | 0.85 | 0.84 | 0.93 | 0.93 |
| CAT. C (pbw) | 0.32 | 0.32 | 0.32 | 0.32 | 0.32 |
| Ex. 1 Prepolymer (pbw) | 202.21 | — | — | — | — |
| Polyisocyanate A (pbw) | — | — | 170.76 | — | — |
| Polyisocyanate B (pbw) | — | 175.29 | — | — | — |
| Polyisocyanate C (pbw) | — | — | — | 202.21 | — |
| Polyisocyanate D (pbw) | — | — | — | — | 202.21 |
| HCFC-141b (pbw) | 35.0 | 35.0 | 34.4 | 38.46 | 38.46 |
| NCO/OH | 2.73 | 2.50 | 2.50 | 2.73 | 2.73 |
| Lab Cream Time (sec) | 11 | 10 | 9 | 10 | 11 |
| Lab Gel Time (sec) | 20 | 19 | 18 | 19 | 20 |
| Lab Tack Free | 25 | 25 | 23 | 24 | 25 |

TABLE 3-continued

| EX. | 12 | 13 | 14 | 15 | 16 |
|---|---|---|---|---|---|
| Time (sec) | | | | | |
| Box Density (lb/ft³) | 1.56 | 1.61 | 1.54 | 1.59 | 1.56 |
| Cup Density (lb/ft³) | 1.86 | 1.97 | 1.75 | 1.89 | 1.86 |
| Firmness 15 min. (cm) | 0.60 | 0.50 | 0.55 | 0.58 | 0.60 |
| Pressure Max. (hPa) | 353 | 396 | 380 | 331 | 353 |
| End height (cm) | 81.5 | 78.7 | 83 | 80.7 | 81.5 |
| Lamin. Cream Time (sec) | 6 | 10 | 7 | 7 | 6 |
| Lamin. Gel Time (sec) | 12 | 20 | 15 | 14 | 12 |
| Lamin. Tack Free Time (sec) | 15 | 23 | 18 | 20 | 15 |
| Board Core Density (lb/ft³) | 1.68 | 1.75 | 1.54 | 1.60 | 1.68 |
| Comp. Strength (lb/in²) | 15.24 | 8.56 | 7.01 | 11.00 | 15.24 |

\* Comparative Example
Footnotes mean same as in Table 1.

Although the invention has been described in detail for the purpose of illustration it is to be understood that such detail is solely for that purpose and that variations can be made therein by those skilled in the art without departing from the spirit and scope of the invention except as it may be limited by the claims.

What is claimed is:

1. A process for the production of a rigid polyurethane foam comprising mixing a) an NCO-terminated prepolymer which is the reaction product of
        1) a polymeric diphenylmethane diisocyanate having a viscosity at 25° C. of from about 50 to about 1,000 mPa·s and
        2) a polyester polyol blend having a functionality of from about 1.8 to about 4.0 and a molecular weight of from about 400 to about 2,000
        formed by reacting 1) and 2) in amounts such that the equivalent ratio of isocyanate groups to hydroxyl groups is from about 15:1 to about 160:1,
    b) a compound containing isocyanate-reactive hydrogen atoms, and
    c) a blowing agent selected from the group consisting of 1,1-dichloro-1-fluoroethane, 1,1,1,3,3-pentafluoropropane, n-pentane, cyclopentane, isopentane, and tetrafluoroethane and allowing the reaction mixture to form a foam.

2. The process of claim 1 in which polyol a)2) is a polyester polyol blend having a functionality of approximately 2.

3. The process of claim 2 in which the polyester polyol blend is a phthalic acid anhydride-based polyester polyol.

4. The process of claim 2 in which the compound containing isocyanate-reactive hydrogen atoms b) is selected from the group consisting of polyester blends based on phthalic anhydride and polyester blends based on 1,4- and 1,2-benzenedicarboxylic acid.

5. The process of claim 1 in which the blowing agent c) is HCFC 141b.

6. The process of claim 1 in which the reaction mixture is applied to a substrate.

\* \* \* \* \*